Jan. 13, 1959 H. BRUINING ET AL 2,869,024
TELEVISION PICK-UP TUBE
Filed April 22, 1954
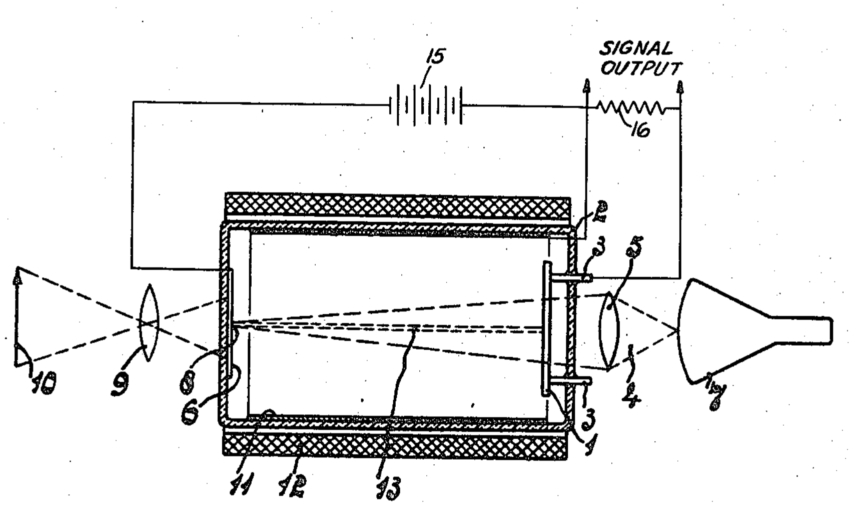
INVENTORS
HAJO BRUINING
JAN CAREL FRANCKEN
PIETER SCHAGEN
BY Fred M Vogel
AGENT United States Patent Office 2,869,024

Patented Jan. 13, 1959

2,869,024

TELEVISION PICK-UP TUBE

Hajo Bruining, Jan Carel Francken and Pieter Schagen, Eindhoven, Netherlands, assignors, by mesne assignments, to North American Philips Company, Inc., New York, N. Y., a corporation of Delaware Application April 22, 1954, Serial No. 425,010

Claims priority, application Netherlands May 13, 1953

2 Claims. (Cl. 315—10)

This invention relates to television pick-up or camera tubes, and to systems employing such tubes.

It has definite advantages with television pick-up tubes to use light beam scanning, which is to be understood to mean that the electrons required for scanning the image electrode are obtained from a light spot moving over a surface having photo-electric properties. In known pick-up tubes having electron-optical projection of the photocathode image the light beam is directed to the photoelectric cathode providing the conversion of the luminous image to be transmitted into an electron image. Thus the image electrode can be scanned by electrons on the side facing the photo-electric cathode. In this method of producing a scanning beam by means of a separate electrode system difficulties may arise from the action of the lens fields on the path followed by these electrons. In such a tube the means for the electron-optical projection of the photo-cathode image onto the image electrode also provide focusing of the electron scanning beam. Thus the image electrode is scanned completely in accordance with the movement of the light spot over the photo-cathode surface, so that any errors in the electron-optical projection, since they act in a similar manner on the scanning beam, will not affect the image finally produced in the reproducing tube. No difficulties arise for example from image rotation and S-shaped distortion due to the use of magnetic fields for the electron-optical projection. It is furthermore advantageous that the direction of the forward propagation of the electrons at each point of the image electrode is equal to that of the projecting electron beams, so that the contrast conditions can be better maintained in scanning the electron-image on the image electrode.

In order to project the light spot undistorted onto the photo-electric cathode, a mirror is arranged in the luminous path of the scanning beam, this mirror deflecting the light beams into the direction of the axis of the image transmitting tube. The mirror is, moreover, located in the light path of the image to be transmitted and thus causes a material loss of light. This loss may be reduced by using a semi-transparent mirror, but even then such an arrangement is less attractive. A direct projection of the light spot on the photo-electric cathode is to be preferred; in this case, however, the source of light must be arranged outside the luminous path of the image to be transmitted. Since in this case the angle of incidence between the scanning beam and the photo-electric cathode is much smaller, measures are required to prevent the light spot from being deformed. With a view to the position of the source of light relative to the pick-up tube the required space in both cases is utilized less effectively.

The invention has for its object to obtain an undistorted light spot on the photo-electric cathode of a pick-up tube having a photo-electric cathode and electron-optical projection of the photo-cathode image by means of the conventional expedients required for the projection and to minimize the space required for this purpose. According to the invention the image electrode is pervious to light and is located in the luminous path of the scanning beam.

There is no objection to use a transparent image electrode. In modern pick-up tubes this electrode is, in general, made of a thin layer of mica or of a glass film having suitable properties for producing the electron image. These screens are so thin that they hinder the passing light only to a very slight extent. As an alternative the signal electrode forming part of the image electrode may be made from a substantially transparent metal film. Although the image electrode, as the case of a mirror, intercepts part of the light, there is the difference that the luminous intensity of the scanning beam may be increased in accordance with the absorption due to the image electrode. The light intensity of the image projected onto the photo-electric cathode can, of course, not be increased at will.

The drawing shows by way of example one embodiment of the pick-up tube according to the invention in conjunction with the source of light for producing the scanning spot on the photo-electric cathode of the tube.

The transparent image electrode 1 is arranged in the vacuum space of a glass vessel 2 on two or more supporting wires 3, secured, for example, sealed, in the wall of the vessel. These supports are electrically connected to the signal electrode, associated with the image electrode, with which it forms a unit. It may be made in the form of a metal deposit, but as an alternative it may be constituted by a grid of very thin wires, having little shadow effect. The grid may serve as a support for the image electrode 1, which may be made of a thin layer of mica or of another insulator. Image electrodes of this kind are known per se, so that its construction will not be explained more fully. It is important that a minimum quantity of light should be absorbed. The light beam 4 is projected with the aid of the lens 5 onto the photo-electric cathode 6. The light rays emanate from a light spot on the fluorescent screen of a cathode-ray tube 7, this spot being produced in known manner by a beam of rapid electrons operating in this tube. This unit is known as a flying spot scanner. These light rays are concentrated by the lens 5 and united in the scanning spot 8 on the photo-electric cathode 6. If the light spot moves over the screen of the tube 7, the scanning spot moves in opposite sense. By moving the light spot in accordance with the known line frame, the scanning spot 8 described a corresponding frame on the photo-electric cathode 6.

The photo-electric cathode 6 is applied to the transparent wall of the vessel 2 opposite the image electrode 1. It is not different from the conventional constructions of pick-up tubes. With the use of the lens 9 an image of the scene indicated by the arrow 10 is reproduced on the photo-electric cathode 6. This produces electron emission on the side of the cathode surface facing the image electrode. By means of an electric field, produced by a higher potential of the electrode 11 from the source 15 than is supplied to the cathode 6, the electrons are accelerated in the direction of the image electrode. The excitation of the coil 12 produces a magnetic field providing the focusing effect.

In the same manner as the electrons emanating from each point of the photo-electric cathode 6 owing to the exposure are collected in corresponding points of the image electrode 1, the electrons 13 set free by the light spot 8 are concentrated in a small sectional area on the image electrode 1. The movement of the scanning spot 8 produces displacement of this sectional area, so that upon scanning of the photo-electric cathode also scanning of the image electrode takes place by the electron beam 13.

The operation of the pick-up tube according to the invention is otherwise the same as that of the conventional tubes having a photo-electric cathode, in which the image electrode is scanned by an electron beam emanating from a separate electrode system provided exclusively for this purpose. The output signal is derived from an impedance 16 connected between the electrode 11 and the image electrode 1.

The acceleration electrode 11 is shown as a wall coating, but it may be constituted by a metal cylinder arranged inside the tube. If an electro-static electron lens of two or more cylindrical electrodes is used for reproducing the photo-electric cathode 6 on the image electrode 1, the concord between photo-cathode scanning and image-electrode scanning is maintained, while also the long magnet coil 12 may be replaced by a short coil, so that the photo-cathode is reproduced electron-optically amplified on the image electrode.

What is claimed is:

1. A system comprising a television camera tube including an elongated housing having transparent end portions, a photo-electric cathode within said housing adjacent one of said transparent end portions, a substantially transparent electron-image-establishing electrode adjacent the other of said transparent end portions and extending substantially in the same direction as the photo-electric cathode, first optical means for imaging on the side of said photo-electric cathode adjacent said one transparent end portion and through said one transparent end portion an external object to be televised to produce a corresponding electron image, flying spot scanning means adjacent the other transparent end portion of said housing, second optical means for projecting an image of said flying spot through said other transparent end portion and through said substantially transparent electron-image-establishing electrode and onto the side of said photo-electric cathode facing said electron-image-establishing electrode whereby said photo-electric cathode may be light-scanned from a direction substantially orthogonal to its surface, and electron optical means for projecting the electrons produced at said photo-electric cathode onto said electron-image-establishing electrode.

2. A system comprising a television camera tube including an elongated housing having transparent end portions, a single photo-electric cathode within said housing adjacent one of said transparent end portions, a substantially transparent, charge-retaining image electrode adjacent the other of said transparent end portions and extending substantially parallel to the photo-electric cathode, first optical means for imaging on the side of said photo-electric cathode adjacent said one transparent end portion and through said one transparent end portion an external object to be televised to produce a corresponding electron image, flying spot scanning means adjacent the other transparent end portion of said housing, second optical means for projecting an image of said flying spot through said other transparent end portion and through said substantially transparent image electrode and onto the side of said photo-electric cathode facing said image electrode whereby said photo-electric cathode may be light-scanned from a direction substantially orthogonal to its surface, and electron optical means surrounding the light path between the cathode and image electrode for projecting the electrons produced at said photo-electric cathode onto said image electrode.

References Cited in the file of this patent

UNITED STATES PATENTS

| | | |
|---|---|---|
| 2,172,727 | Bruche et al. | Sept. 12, 1939 |
| 2,213,173 | Rose | Aug. 27, 1940 |
| 2,256,300 | Van Mierlo | Sept. 16, 1941 |
| 2,617,058 | DeBoer et al. | Nov. 4, 1952 |
| 2,618,761 | Rose | Nov. 18, 1952 |
| 2,654,853 | Weimer | Oct. 6, 1953 |
| 2,777,970 | Weimer | Jan. 15, 1957 |

FOREIGN PATENTS

| | | |
|---|---|---|
| 529,410 | Great Britain | Nov. 20, 1940 |